(12) United States Patent
Maetschke

(10) Patent No.: US 6,792,139 B1
(45) Date of Patent: Sep. 14, 2004

(54) DETERMINING THE ORIENTATION OF SUBJECT DATA IN A TWO-DIMENSIONAL DATA SET

(75) Inventor: Stefan Maetschke, Unterrieden (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/572,028

(22) Filed: May 16, 2000

(51) Int. Cl.[7] .................................................. G06K 9/36

(52) U.S. Cl. ........................ 382/151; 356/138; 382/170

(58) Field of Search ................................ 382/289, 288, 382/287, 286, 285, 291, 141, 144, 145, 151, 168, 170, 184, 199, 172; 356/138, 139, 139.1; 702/150, 151, 45; 348/86, 125; 345/596, 597; 358/3.01, 3.23

(56) References Cited

U.S. PATENT DOCUMENTS

| | | | | |
|---|---|---|---|---|
| 5,288,986 A | * | 2/1994 | Pine et al. | 235/494 |
| 5,410,620 A | * | 4/1995 | Yoshida | 382/317 |
| 5,726,435 A | * | 3/1998 | Hara et al. | 235/494 |
| 5,828,819 A | * | 10/1998 | Do et al. | 345/605 |
| 6,140,960 A | * | 10/2000 | Kitayoshi | 342/360 |
| 6,151,406 A | * | 11/2000 | Chang et al. | 382/147 |
| 6,473,698 B1 | * | 10/2002 | Albert et al. | 702/45 |

* cited by examiner

Primary Examiner—Bhavesh M. Mehta
Assistant Examiner—Seyed Azarian
(74) Attorney, Agent, or Firm—Foley & Lardner LLP (57) ABSTRACT

A method of determining the orientation of subject data in a two-dimensional data set includes: determining a center of the subject data; determining angles from the center to each subject data; generating a frequency distribution based on the angles; and determining the orientation of the subject data based on the frequency distribution.

44 Claims, 9 Drawing Sheets

DETERMINING THE ORIENTATION OF SUBJECT DATA IN A TWO-DIMENSIONAL DATA SET

FIELD OF THE INVENTION

The present invention relates generally to the field of signal processing. More particularly, the present invention relates to processing a two-dimensional data set. More particularly still, the present invention relates to determining the orientation of subject data in a two-dimensional data set.

BACKGROUND OF THE INVENTION

Systems for determining the orientation of subject data in a two-dimensional data set are useful in many applications. Many examples are found in industrial automation, where the subject data represents a manufactured object and the data set is a two-dimensional image captured by a video camera. In one application, a robotic arm must know the orientation of the object so that it can grab the object. In another application, the orientation of a relay having a plurality of screws therein must be known so that the presence of all screws can be verified. In yet another example, the orientation of a label on a product must be verified. In still another example, the number of chocolates in a box of candy must be counted and, therefore, the orientation of the box must first be determined.

Pattern matching systems for identifying the orientation of an object have been implemented wherein an operator defines specific invariable features of the object (e.g., edges, corners, etc.) or the operator provides a template data set of the object to the system. In this system, the information input by the operator is compared to an acquired image data set and the image data set is rotated until a match is found. One drawback of this system is that a separate template data set is needed for each object, which is inconvenient for automation lines having multiple products. Also, this system is computationally expensive and slow since template data is compared to image data on a pixel-by-pixel basis. Furthermore, this system is not fully automatic since it requires operator input.

Principal Component Analysis (PCA) has also been implemented as an automatic method for identifying the rotational position of an object. For example, a PCA system may use main axis transformation of the object data to identify its rotational position. However, this system is only effective for distinctly elongate objects, such as a pencil.

Accordingly, there is a need for an improved system and method for determining the orientation of subject data in a two-dimensional data set. There is further a need for such a system which is automatic and requires a minimum of operator input. Further, there is a need for a system and method for identifying the orientation of subject data regardless of the inner or outer contour of the subject data. Further still, there is a need for a system for identifying the orientation of an object with a uniform contour but a varied surface texture.

SUMMARY OF THE INVENTION

According to an exemplary embodiment, a method of determining the orientation of subject data in a two-dimensional data set includes: determining a center of the subject data; determining angles from the center to each subject data; generating a frequency distribution based on the angles; and determining the orientation of the subject data based on the frequency distribution.

According to an alternative embodiment, a method of determining the orientation of object data in an image data set is disclosed. The object data includes visible characteristic data. The method includes: determining a graphical center of the object data; determining angles from the graphical center to each object data; grouping the angles into intervals; determining mean values of the visible characteristic data for each interval; and determining the orientation of the object data based on the mean values of the visible characteristic data.

According to another alternative embodiment, a system for determining the orientation of subject data in a two-dimensional data set is disclosed. The system includes means for determining a center of the subject data, means for determining angles from the center to each subject data, means for generating a frequency distribution based on the angles, and means for determining the orientation of subject: data based on the frequency distribution.

According to yet another alternative embodiment, an apparatus for determining the orientation of an object include a video camera, a memory, and a signal processing circuit. The video camera is configured to acquire an image of the object and to generate an image data set having object data. The signal processing circuit is coupled to the video camera and the memory and is configured to store the image data set in the memory, determine angles from a center of the image data set to each object data, generate a frequency distribution of the object data based on the angles, and determine the orientation of the object based on the frequency distribution.

BRIEF DESCRIPTION OF THE DRAWINGS

The invention will become more fully understood from the following detailed description, taken in conjunction with the accompanying drawings, wherein like reference numerals refer to like elements, and in which.

DETAILED DESCRIPTION OF THE PREFERRED EMBODIMENTS

Figure 1:
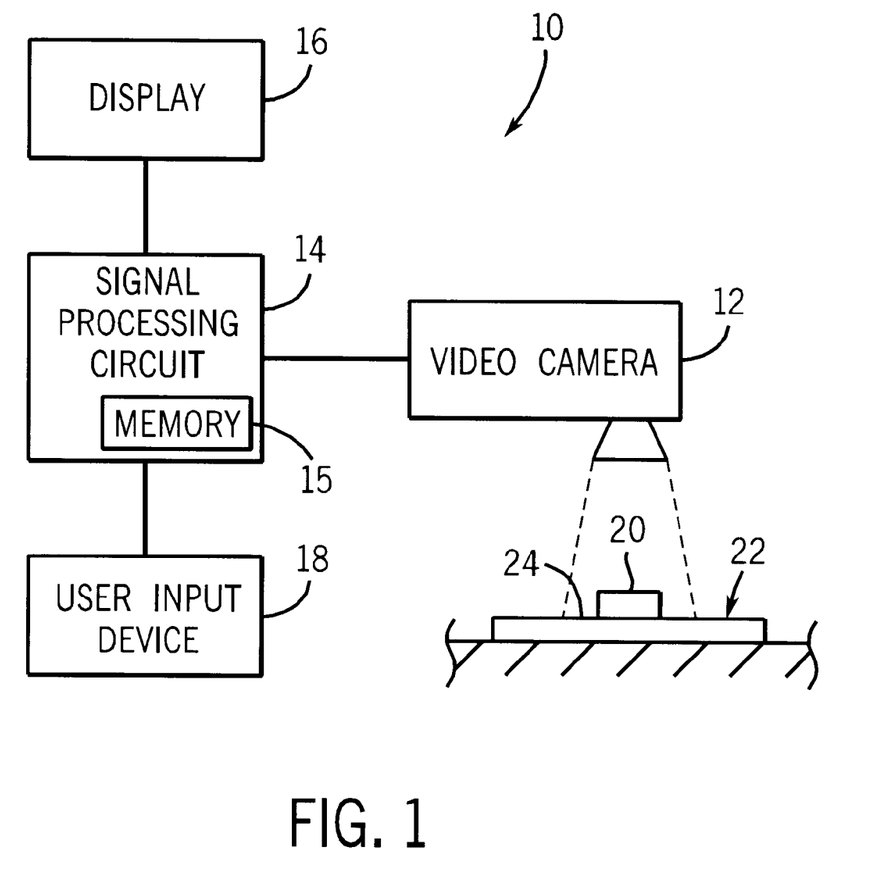
FIG. 1 is a block diagram of a system for determining the orientation of subject data according to an exemplary embodiment.

Referring first to FIG. 1, an exemplary system for determining the orientation of subject data in a two-dimensional data set is shown. An image acquiring and processing system 10 includes a video camera 12 and signal processing circuit 14, and optionally a display 16 and user input device 18. Signal processing circuit 14 further includes a memory 15. System 10 acquires a signal data set 26 (e.g., an image data set) (see FIG. 2) of a subject 20 (e.g., an object) on a conveyor belt 22. System 10 may be implemented on a multisignal image processing system, such as, a SIMULTAN machine, manufactured by Siemens AG, Munich, Germany. While one embodiment of the system will be described with reference to a system for determining the orientation of an object, it is understood that the principles disclosed herein are applicable to systems for determining the orientation of other two-dimensional signals.

Figure 2:
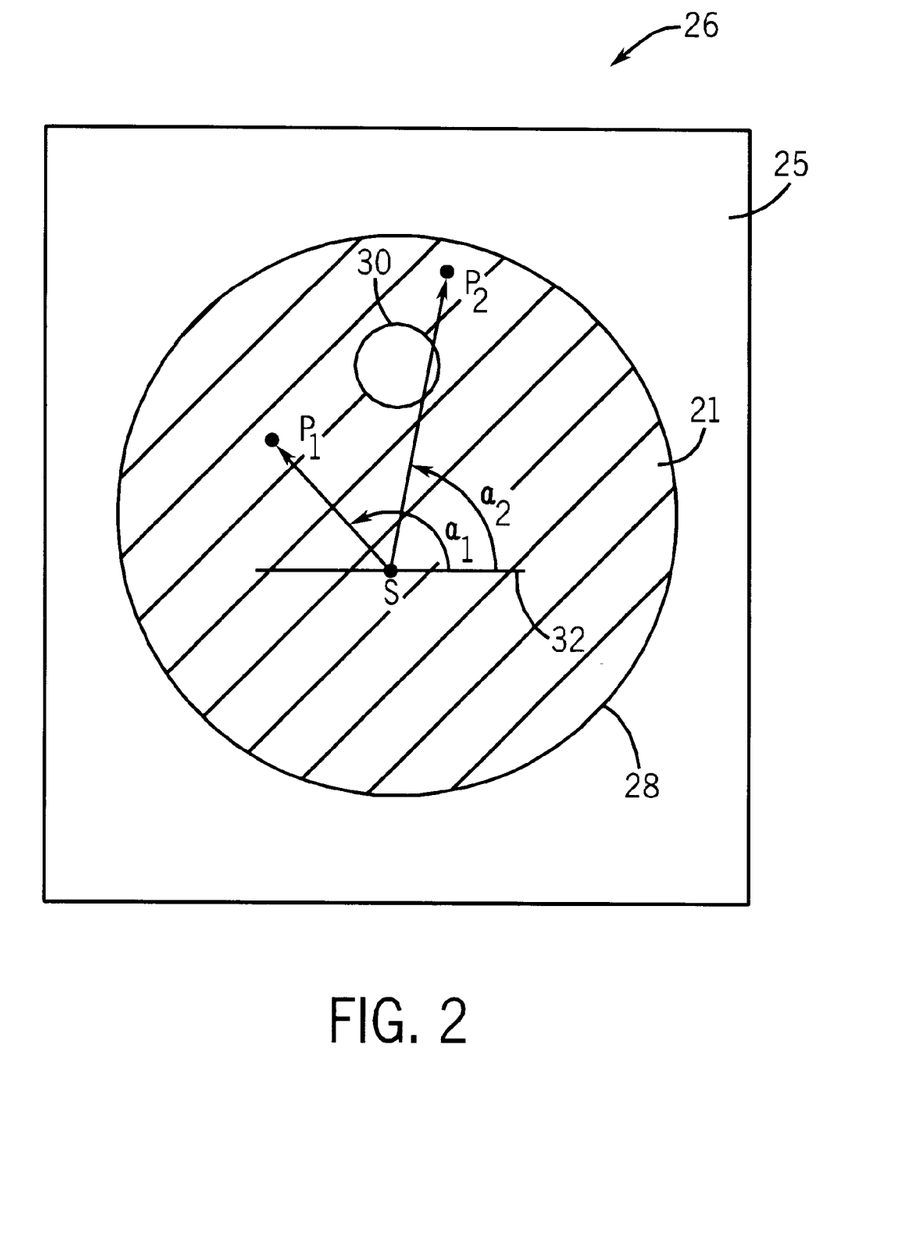
FIG. 2 is a digital image including subject data and background data.

Video camera 12 is configured to acquire a signal data set 26 in the form of a digital image of subject 20 against a background or portion 24 of conveyor belt 22. In this exemplary embodiment, subject is a dial having a circular cutout 30. FIG. 2 shows signal data set 26 (e.g., a digital image of the dial) as viewed by video camera 12. Signal data set 26 includes subject data 21 and background data 25. Video camera 12 acquires signal data set 26 in gray scale and transmits signal data set 26 to signal processing circuit 14. Alternatively, video camera 12 may acquire signal data set 26 in color and transmit separate signal data sets for red, green, and blue for each image.

Signal processing circuit 14 (i.e., a computer) includes a programmed microprocessor (e.g., an INTEL x86 processor, microcontroller, etc.), memory, communication interfaces, etc. Alternatively, signal processing circuit 14 may comprise programmable logic, discrete circuit components, etc. Circuit 14 operates according to a software or hardware program stored in memory (e.g., hard disk storage, firmware, non-volatile memory, etc.), and is configured to perform various signal processing functions on the received signal data set. Circuit 14 may further be configured to provide display signals to display 16 (e.g., a cathode ray tube, liquid crystal display, etc.) and receive user input from user input device 18 (e.g., a keyboard, touchscreen, etc.).

Figure 3:
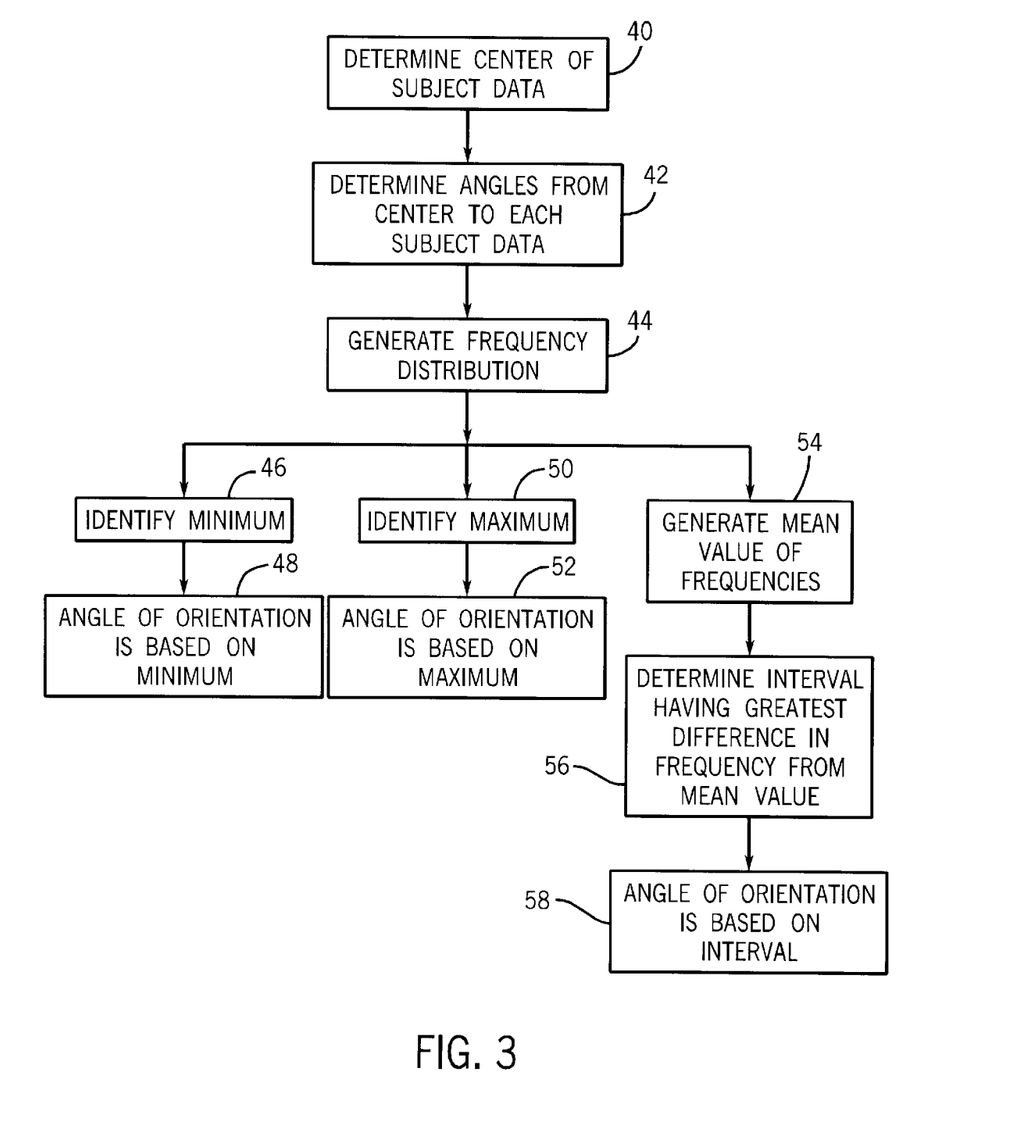
FIG. 3 is a flow diagram showing steps according to an exemplary method.

Referring now to FIGS. 2 and 3, steps performed by circuit 14 will now be described. Advantageously, circuit 14 is configured to segment subject data 21 from background data 25 using any method of segmentation, such as, for example, that disclosed in commonly assigned application Ser. No. 09 /572,624, titled "Method and Apparatus for Signal Segmentation" by Maetschke, filed concurrently herewith, which is herein incorporated by reference. Subject data 21 may be received from video camera 12, from a memory, or from another device. At step 40, circuit 14 is configured to determine a center (e.g., a graphical center) of subject data 21. The graphical center (S) is found by locating the point S having an x-coordinate equal to the mean value of all x-coordinates in subject data 21 and a y-coordinate equal to the mean value of all y-coordinates in subject data 21.

S(x,y)=(mean_value_X_coordinates, mean_value_Y_coordinates)

In subject data 21 shown in FIG. 2, center S occurs slightly below the center of an outer ring 28 of subject data 21, due to the presence of circular cutout 30. Other methods of determining a center or graphical center of subject data 21 may be used.

At step 42, circuit 14 is configured to determine angles, from a reference 32 extending through center S to each subject data point, such as point P1 and point P2. For each point $P_1$, $P_2$, etc. in subject data 21, an angle $\alpha_1$, $\alpha_2$, etc. exists relative to reference 32. One method of deriving the angle a for each point P in subject data 21 is the following:

$$\alpha_i = \arctan\left(\frac{y_s - y_i}{x_s - x_i}\right)$$

where $\alpha_i$ is the angle for each point $P_i$, $x_S$ and $y_S$ are the x- and y-coordinates of center S, and $x_i$ and $y_i$ are the x- and y-coordinates of point $P_i$. A vector $SP_i$ is calculated from center S to each point $P_i$. Other methods of determining angles from center S to each subject data point $P_i$ may be used including, but not limited to functions of the point $P_i$ relative to the point S.

Figure 4:
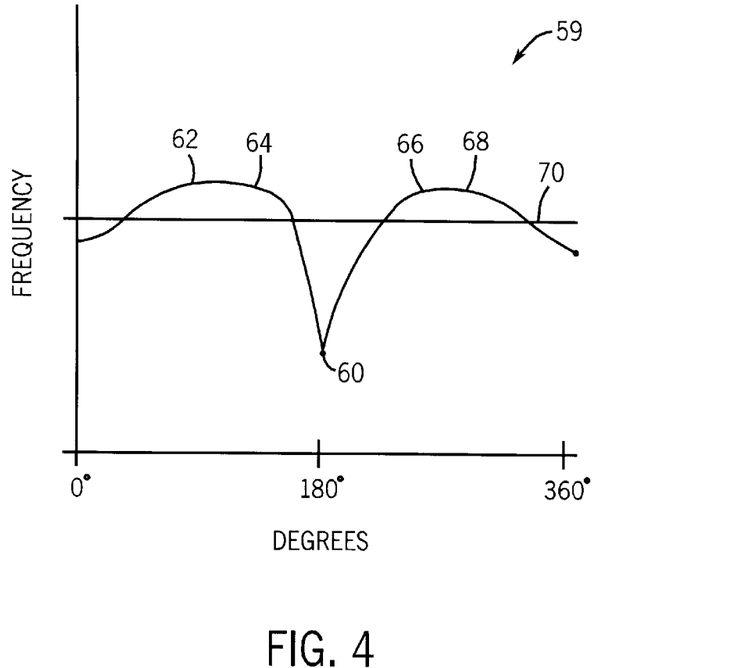
FIG. 4 is a frequency distribution generated according to an exemplary embodiment.

At step 44, circuit 14 is configured to generate a frequency distribution 59 (e.g., a histogram) (see FIG. 4) of the angles for each point $P_i$ of signal data set 26 based on the frequency of occurrence of each angle in signal data set 26. The x-axis of FIG. 4 represents a set of angle intervals and the y-axis represents the frequency associated with each angle interval. The angle intervals range from 0 to 360 degrees in this exemplary embodiment. To reduce processing time and to get a smooth histogram, the angle values may alternatively be grouped into ranges of angle values. Thus, each angle interval may include one or more angle values. The range of frequencies along the y-axis is dependent upon the size of signal data set 26 and the resolution of the acquired image.

Frequency distribution 59 provides information regarding the orientation of subject data 21. The orientation of subject data 21 is representative of the orientation of subject 20. This orientation may be obtained from frequency distribution 59 by one or more of several methods, either automatic or manual. For example, frequency distribution 59 may be displayed on display 16, and the user can manually select or identify the orientation via user input device 18. The automatic method used will depend upon the contour of subject data 21. One method of determining the orientation of subject data 21 from the frequency distribution is to identify a minimum frequency at a step 46. In FIG. 4, the minimum frequency occurs at point 60. Thus, at step 48, circuit 14 determines that the angle of orientation of subject data 21 is approximately 180 degrees. The "minimum frequency" test is suitable for the dial and circular cutout contour depicted in FIG. 2.

Figure 5:
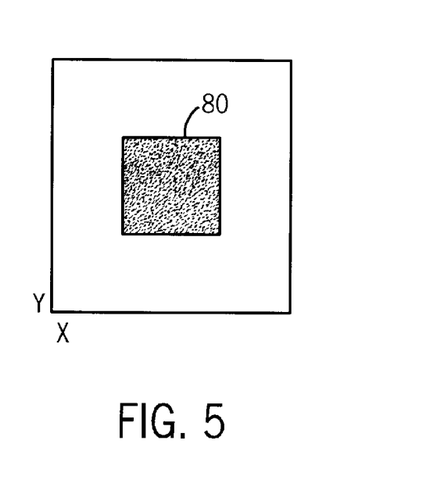
FIG. 5 is a square contour subject data set.
Figure 6:
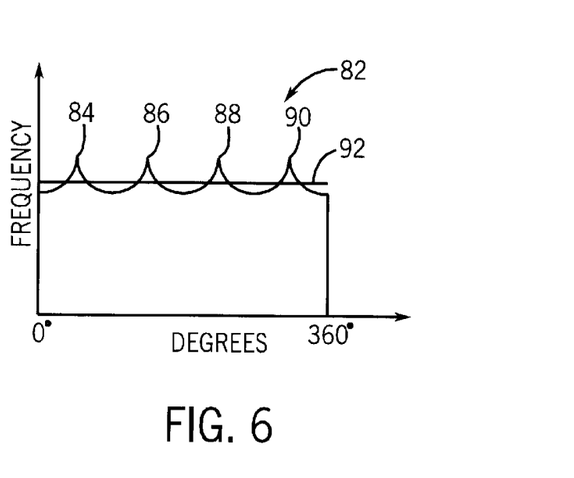
FIG. 6 is a frequency distribution generated according to an exemplary embodiment.

A second method of determining the orientation of subject data from the frequency distribution is to identify a maximum frequency. At step 50, circuit 14 is configured to identify a maximum frequency. However, referring to the frequency distribution of FIG. 4, several points are at or near the maximum frequency at a wide range of angle intervals (e.g., angle intervals 62, 64, 66, 68, etc.). Accordingly, using the maximum frequency may not be suitable for the dial and circular cutout contour. With reference to FIGS. 5 and 6, a square contoured subject data 80 is shown, and corresponding frequency distribution 82 generated according to steps 40, 42, and 44 is also shown. The contour of data set 80 is square and, therefore, data set 80 is symmetrical. Frequency distribution 82 identifies four maximum frequencies at points 84, 86, 88 and 90. At step 52, circuit 14 is configured to determine the angle of orientation of subject data 80 based on one of maxima 84, 86, 88 and 90, each of which indicates an equally correct angle of orientation due to the symmetry of subject data 80. Thus, while the "maximum frequency" test may not be suitable for the dial and circular cutout contour, this test is suitable for the square contour.

A third method of determining the orientation of subject data from the frequency distribution is suitable for both dial subject data 21 and square subject data 80. At step 54, a mean value of the frequencies in the frequency distribution is generated. In FIG. 4, the mean value has been plotted at line 70. In FIG. 6, the mean value has been plotted at line 92. At step 56, the angle interval having the greatest difference in frequency from the mean value is determined. In FIG. 4, this angle interval is identified as the angle interval corresponding to point 60. In FIG. 6, this angle interval is identified as the angle interval corresponding to any of points 84, 86, 88, and 90. At step 58, circuit 14 is configured to determine the angles of orientation of subject data 21 and subject data 80 based on the angle interval corresponding to point 60. Thus, this third test is suitable for identifying the orientation of both dial subject data 21 and square subject data 80. Other methods or tests may be used to determine the orientation of the subject data based on the frequency distribution.

EXAMPLES

Figure 7:
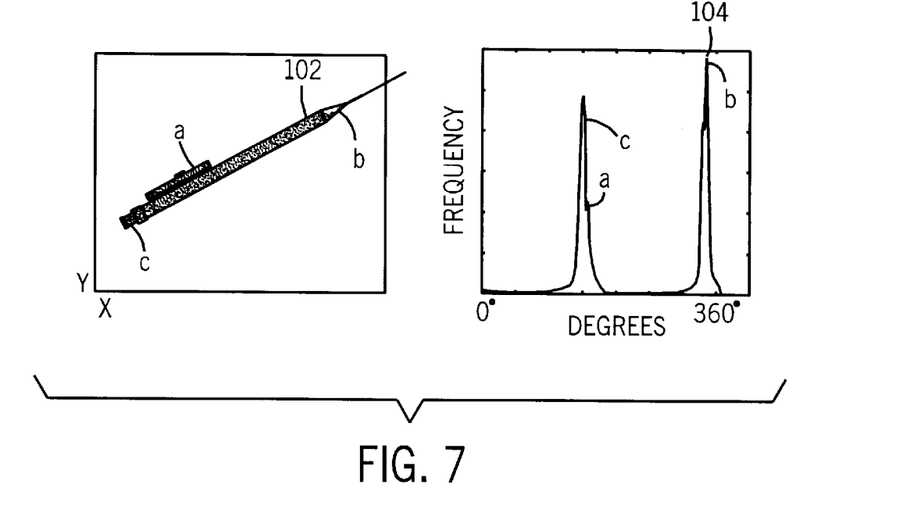
FIG. 7 shows a pencil subject data set and corresponding frequency distribution according to an exemplary embodiment.
Figure 8:
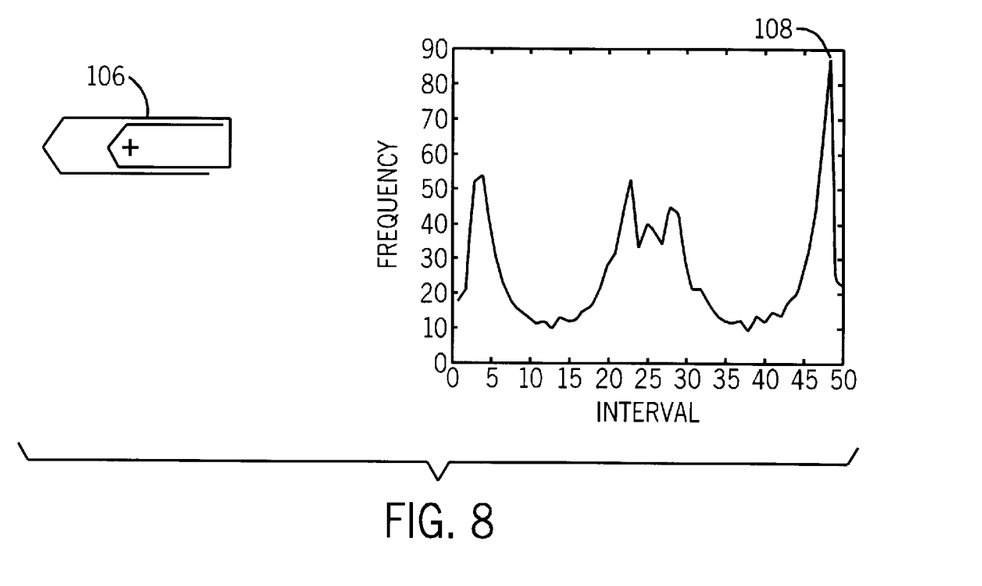
FIG. 8 shows a paper clip subject data set and corresponding frequency distribution according to an exemplary embodiment.
Figure 9:
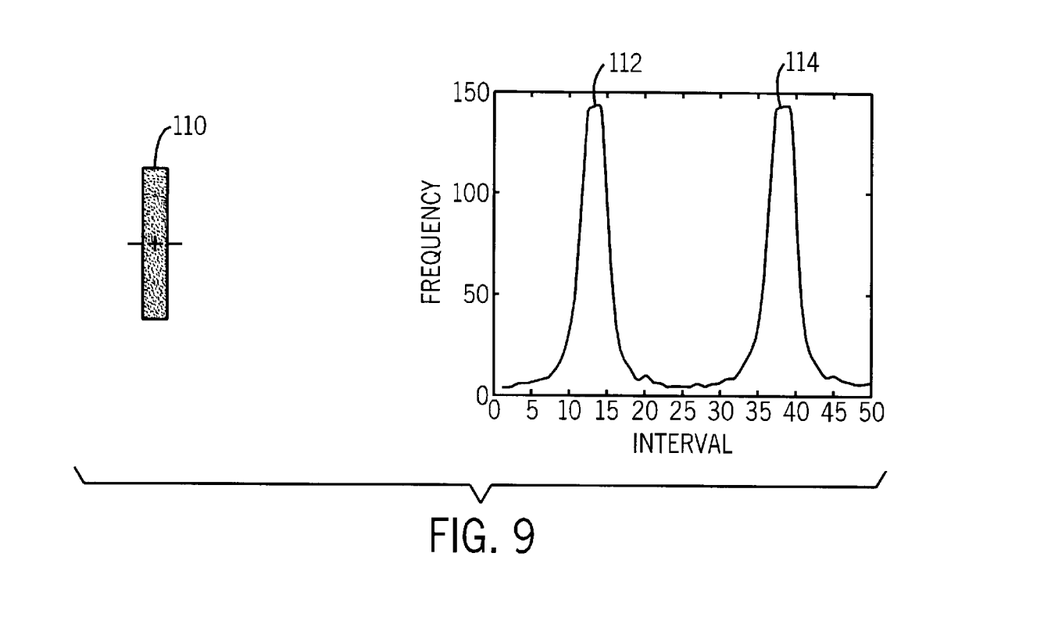
FIG. 9 shows a rectangle subject data set and corresponding frequency distribution according to an exemplary embodiment.
Figure 10:
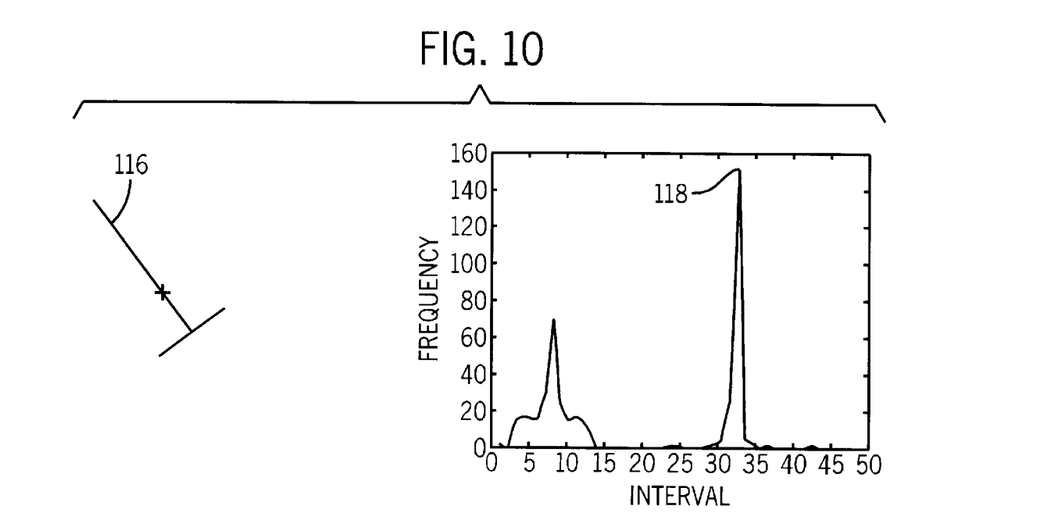
FIG. 10 shows a t-shaped subject data set and corresponding frequency distribution according to an exemplary embodiment.
Figure 11:
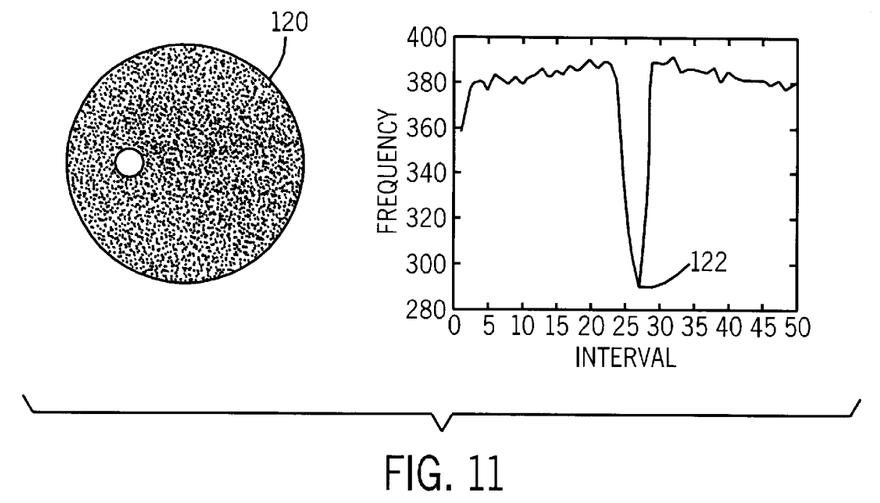
FIG. 11 shows a dial subject data set and corresponding frequency distribution according to an exemplary embodiment.
Figure 12:
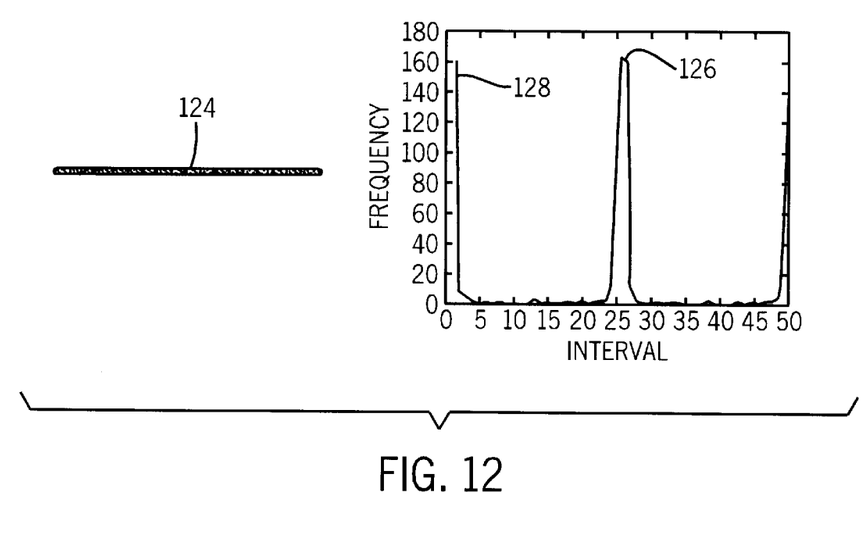
FIG. 12 shows a line subject data set and corresponding frequency distribution according to an exemplary embodiment.
Figure 13:
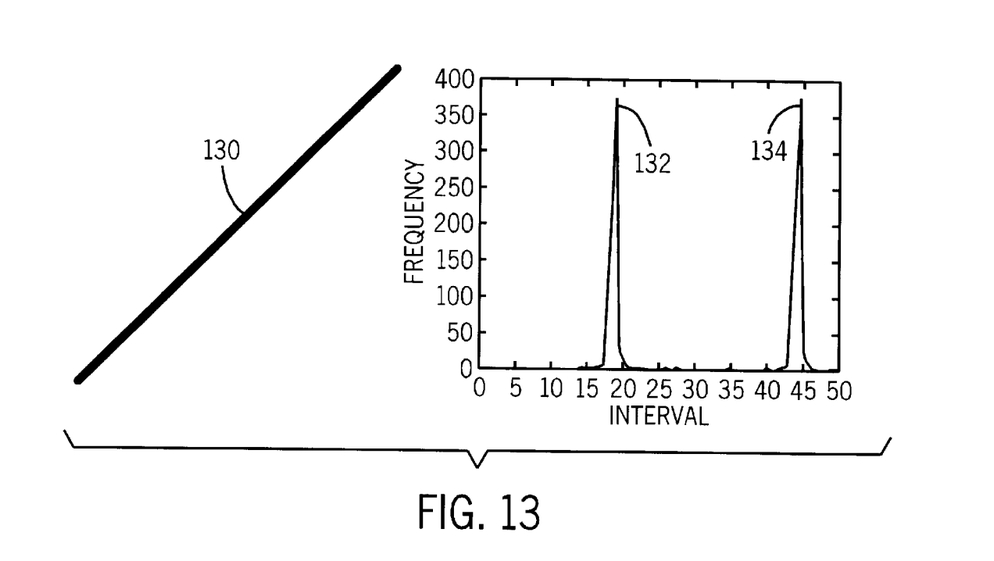
FIG. 13 shows a line subject data set and corresponding frequency distribution according to an exemplary embodiment.

FIGS. 7–13 illustrate subject data sets for objects of various contours and their corresponding frequency distributions generated by an algorithm operating steps 40, 42, 44, 54, 56 and 58. The algorithm was run on a standard desktop personal computer running Windows NT/95. The algorithm includes a small code segment which can load image files (e.g., bitmaps), and another code segment for calculating the orientation angle and writing the angle histogram in a file. This file was loaded by MATLAB, a mathematical software program, and displayed as an image and a diagram. In FIG. 7, the orientation of a pencil data set 102 is indicated by interval 104. In FIG. 8, the orientation of a paper clip data set 106 is indicated by interval 108. In FIG. 9, the orientation of a rectangle data set 110 is indicated by either of intervals 112 or 114, due to its symmetry. In FIG. 10, the orientation of a t-shaped data set 116 is indicated by interval 118. In FIG. 11, the orientation of a dial data set 120 is indicated by interval 122. In FIG. 12, the orientation of a line data set 124 is indicated by either of points 126 or 128 due to its symmetry. In FIG. 13, the orientation of a line data set 130 is indicated by either of points 132 or 134 due to its symmetry.

In FIGS. 8–13, the angle intervals comprise groupings of multiple angle values between 0 and 360 degrees. One hundred angle intervals are provided in the frequency distributions of these examples. According to a further improvement, after an interval is selected as indicating the angle of orientation of the subject data (i.e., at one of steps 48, 52, and 58), circuit 14 is configured to calculate or determine the mean value of the angles in the selected interval to generate the actual angle of orientation. Calculating the mean value will give an angle closest to the angle having the greatest representation in the interval.

Figure 14:
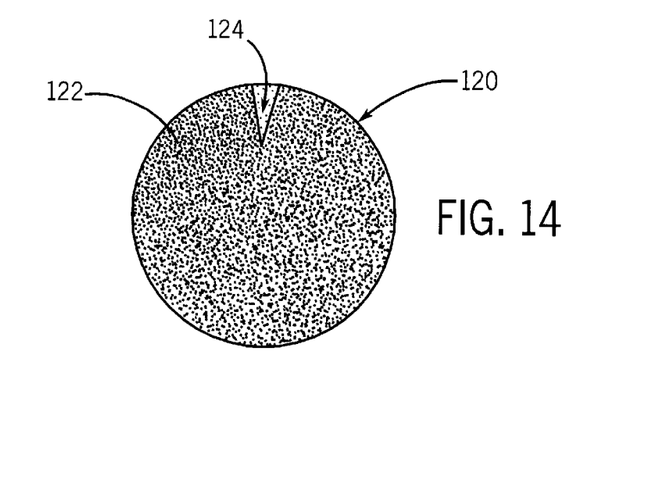
FIG. 14 is a subject data set having varied visual characteristic data.

Some objects have contours which are uniform, but visible characteristics (e.g., gray scale, color, texture, etc.) which are non-uniform. Referring to FIG. 14, an object data set 120 is shown having a uniform contour (e.g., a circle in this embodiment) but a variable gray scale. Object data set 120 represents a dial having a lightly shaded portion indicating the orientation of the dial. Each of the object data includes a location field and a visible characteristic field in the data structure. Object data set 120 includes data having a first gray scale 122 and data having a second gray scale 124.

Figure 15:
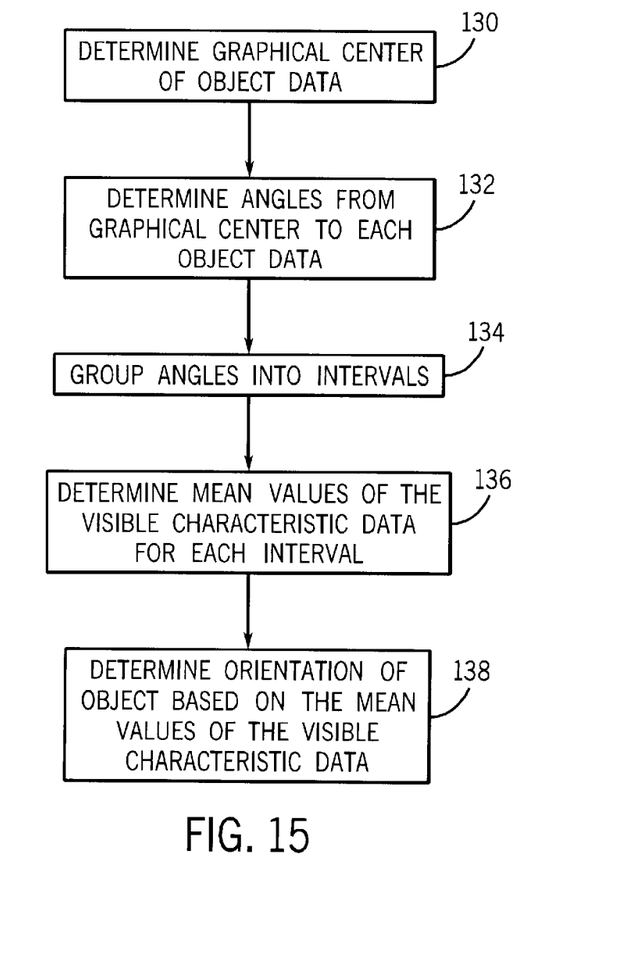
FIG. 15 is a flow diagram showing steps according to an alternative embodiment.

Referring now to FIG. 15, a method of determining the orientation of object data set 120 is shown. At step 130, circuit 14 is configured to determine the graphical center of object data set 120, as described above with respect to step 40. At step 132, circuit 14 is configured to determine angles from the graphical center to each object data, as described above with respect to step 42. At step 134, circuit 14 is configured to group the angles into intervals. Although a frequency distribution of the angles may be generated, it is not necessary in step 134. Further, the intervals may each include one angle, or perhaps multiple angles. At step 136, circuit 14 calculates the mean values of the visible characteristic data within each interval.

Figure 16:
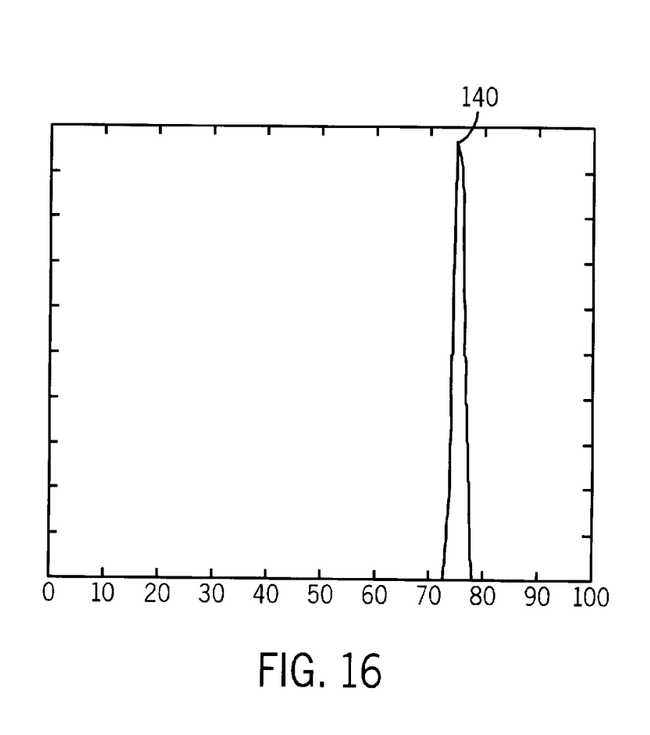
FIG. 16 is a frequency distribution generated according to the alternative embodiment of FIG. 15.

From these mean values, circuit 14 is configured to determine the orientation of object data 120 and, thus, of the object, as follows. Circuit 14 is configured to generate a frequency distribution of the mean values (FIG. 16) to automatically identify the orientation of object data 120. In this example, a maximum point 140 indicates the orientation of object data 120 and, more particularly, maximum point 140 indicates the orientation of data having the second gray scale 124. Alternatively, these values may be displayed via display 16 so that an operator may make a determination as to the orientation of object data 120. Other methods of determining the orientation of object data based on these mean values are contemplated.

While the exemplary embodiments have been illustrated and described, it should be understood that the embodiments disclosed herein are offered by way of example only. For example, while the exemplary embodiment is described with reference to an image acquisition system, other two-dimensional data with subject data having an orientation are suitable, such as, infrared images, pseudo color images, x-ray images and other transformations of images. The invention is not limited to a particular embodiment, but extends to various modifications that nevertheless fall within the scope of the appended claims.

What is claimed is:

1. In a computerized system, a method of determining the orientation of subject data in a two-dimensional data set, comprising:

determining a center of the subject data;

determining angles from the center to each subject data;

generating a frequency distribution based on the angles; and determining the orientation of the subject data based on the frequency distribution.

2. The method of claim 1, further comprising locating one of a maximum and a minimum on the frequency distribution, whereby the angle associated with the one of the maximum and the minimum represents the angle of orientation of the subject data in the two-dimensional data set.

3. The method of claim 1, wherein the frequency distribution includes a set of intervals and associated frequencies, the method further comprising:

generating a mean value of the frequencies in the frequency distribution; and determining an interval having the greatest difference in frequency from the mean value, whereby the angle associated with the interval represents the angle of orientation of the subject data in the two-dimensional data set.

4. The method of claim 3, wherein the interval includes a plurality of angles.

5. The method of claim 4, further comprising determining the mean value of the angles in the interval, whereby the mean value of the angles in the interval represents the angle of orientation of the subject data.

6. The method of claim 1, further comprising segmenting the subject data from the two-dimensional data set.

7. The method of claim 1, wherein the two-dimensional data set is an image data set.

8. The method of claim 7, wherein the subject data is object data.

9. The method of claim 1, wherein the subject data includes visible characteristic data, further comprising:

determining mean values of the visible characteristic data for each angle; and determining the orientation of the subject data based on the visible characteristic data.

10. The method of claim 9, wherein the visible characteristic is selected from the group consisting of gray scale, color, and texture.

11. The method of claim 1, wherein the center is determined by finding the mean values of the subject data along each dimension.

12. The method of claim 1, wherein each angle is a function of the coordinates of the center minus the coordinates of the subject data.

13. The method of claim 12, wherein the function is the arctangent function.

14. The method of claim 1, further comprising calculating vectors from the center to each subject data.

15. In a computerized system, a method of determining the orientation of object data in an image data set, the object data including visible characteristic data, the method comprising:

determining a graphical center of the object data;

determining angles from the graphical center to each object data;

grouping the angles into intervals;

determining mean values of the visible characteristic data for each interval; and determining the orientation of the object data based on the mean values of the visible characteristic data.

16. The method of claim 15, wherein each interval includes a one degree angular interval.

17. The method of claim 15, further comprising segmenting the object data from the image data set.

18. The method of claim 15, wherein the visible characteristic data is selected from the group consisting of gray scale data, color data, and texture data.

19. The method of claim 15, wherein the graphical center is determined by finding the mean values of the object data along each dimension of the object data.

20. The method of claim 15, wherein each angle is calculated as a function of the coordinates of the graphical center minus the coordinates of the object data.

21. A system for determining the orientation of subject data in a two-dimensional data set, comprising:

means for determining a center of the subject data;

means for determining angles from the center to each subject data;

means for generating a frequency distribution based on the angles; and means for determining the orientation of subject data based on the frequency distribution.

22. The system of claim 21, further comprising means for locating one of a maximum and a minimum on the frequency distribution, whereby the angle associated with the one of the maximum and the minimum represents the angle of orientation of the subject data in the two-dimensional data set.

23. The system of claim 21, wherein the frequency distribution includes a set of intervals and associated frequencies, the system further comprising:

means for generating a mean value of the frequencies in the frequency distribution; and means for determining an interval whose frequency has the greatest difference from the mean value, whereby the angle associated with the interval represents the angle of orientation of the subject data in the two-dimensional data set.

24. The system of claim 23, further comprising means for determining the mean value of the angles in the interval, whereby the mean value of the angles in the interval represents the angle of orientation of the object data.

25. The system of claim 21, further comprising means for segmenting the subject data from the two-dimensional data set.

26. The system of claim 21, wherein the subject data includes visible characteristic data, further comprising:

means for determining mean values of the visible characteristic data; and means for determining the orientation of the subject data based on the visible characteristic data.

27. The system of claim 26, wherein the visible characteristic is gray scale.

28. The system of claim 21, further comprising means for calculating vectors from the center to each subject data.

29. An apparatus for determining the orientation of an object, comprising:

a video camera configured to acquire an image of the object and to generate an image data set having object data;

a memory; and a signal processing circuit coupled to the video camera and the memory, the signal processing circuit configured to store the image data set in the memory, determine angles from a center of the image data set to each object data, generate a frequency distribution of the object data based on the angles, and determine the orientation of the object based on the frequency distribution.

30. The apparatus of claim 29, wherein the signal processing circuit is configured to locate one of a maximum and a minimum on the frequency distribution, whereby the angle associated with the one of the maximum and the minimum represents the orientation of the object.

31. The apparatus of claim 29, wherein the signal processing circuit is further configured to generate a mean value of the frequencies in the frequency distribution and determine an interval having the greatest difference in frequency from the mean value, whereby the angle associated with the interval represents the angle of orientation of the object.

32. The apparatus of claim 31, wherein the signal processing circuit is further configured to determine the mean value of the angles in the interval, whereby the mean value of the angles in the interval represents the angle of orientation of the object.

33. The apparatus of claim 29, further comprising means for segmenting the object data from the image data set.

34. The apparatus of claim 29, wherein the object data includes visible characteristic data, wherein the signal processing circuit is further configured to determine mean values of the visible characteristic data for each interval, and determine the orientation of the object based on the visible characteristic data.

35. An apparatus for determining the orientation of an object, comprising:

a processing circuit configured to;
receive subject data of a subject of interest which subject data is collected from an image of the subject of interest;
identify a characteristic point in the image received;
determine angles from the characteristic point to a plurality of subject data points of the subject data with respect to a reference, the determined angles comprising a plurality of angular values; and
determine orientation of the subject of interest using the determined angles.

36. The apparatus of claim 35, wherein the plurality of subject data points comprise each point of subject data meeting a predetermined criteria.

37. The apparatus of claim 36, wherein the predetermined criteria is being darker than a predetermined grayscale value.

38. The apparatus of claim 36, wherein the processing circuit is further configured to generate a frequency distribution based on the determined angles, and orientation is determined based on the frequency distribution.

39. The apparatus of claim 35, wherein the characteristic point is a center of the subject data.

40. The apparatus of claim 35, wherein receiving subject data comprises receiving an image from a video camera and segmenting the subject data from the background data.

41. The apparatus of claim 35, wherein the processing circuit is further configured to generate a frequency distribution based on the determined angles, and orientation is determined based on the frequency distribution.

42. The apparatus of claim 35, wherein the processing circuit is further configured to determine mean values of subject data at a plurality of angular intervals based on the determined angles, and orientation is determined based on the mean values.

43. The apparatus of claim 42, wherein the processing circuit is further configured to generate a frequency distribution based on the mean values of the subject data at each angular interval, and orientation is determined based on the frequency distribution.

44. The apparatus of claim 35 wherein the plurality of angular values comprise an angular value of at least one of 0 and 360 degrees and comprise a plurality of different angular values between 0 and 360 degrees.

* * * * *